United States Patent [19]
Mitamura

[11] Patent Number: 5,085,733
[45] Date of Patent: Feb. 4, 1992

[54] ROLLING STEEL BEARING

[75] Inventor: Nobuaki Mitamura, Kawasaki, Japan

[73] Assignee: Nippon Seiko Kabushiki Kaisha, Tokyo, Japan

[21] Appl. No.: 572,480

[22] Filed: Aug. 23, 1990

[30] Foreign Application Priority Data

Aug. 24, 1989 [JP] Japan .................................. 1-217689
Nov. 13, 1989 [JP] Japan .................................. 1-294288

[51] Int. Cl.⁵ .......................... C22C 38/18; C21D 9/36
[52] U.S. Cl. .................................... 148/319; 148/906; 148/333; 384/492
[58] Field of Search ............... 384/492; 148/906, 319, 148/333; 420/111, 104

[56] References Cited

U.S. PATENT DOCUMENTS

| | | | |
|---|---|---|---|
| 3,117,041 | 1/1964 | Kolstinen | 148/39 |
| 3,275,389 | 9/1966 | Neilson et al. | 308/8.2 |
| 4,004,952 | 1/1977 | Jatczak et al. | 148/906 |
| 4,023,988 | 5/1977 | Stickels et al. | 148/12.4 |
| 4,191,599 | 3/1980 | Stickels et al. | 148/16.5 |
| 4,930,909 | 6/1990 | Murakami et al. | 384/492 |

FOREIGN PATENT DOCUMENTS

| | | |
|---|---|---|
| 889248 | 12/1971 | Canada . |
| 5233821 | 3/1972 | Japan . |
| 49-114516 | 11/1974 | Japan . |
| 51-47421 | 12/1976 | Japan . |
| 52-130415 | 11/1977 | Japan . |
| 53-37518 | 4/1978 | Japan . |
| 54-75420 | 6/1979 | Japan . |
| 57-164977 | 10/1982 | Japan . |
| 59-159971 | 9/1984 | Japan .................................. 148/333 |
| 59-232252 | 12/1984 | Japan .................................. 148/319 |
| 60-21359 | 2/1985 | Japan . |
| 61-257452 | 11/1986 | Japan . |
| 8607096 | 12/1986 | Japan . |
| 62-131705 | 8/1987 | Japan . |
| 63-62847 | 3/1988 | Japan . |
| 63-172030 | 7/1988 | Japan . |
| 312349 | 10/1930 | United Kingdom . |
| 450758 | 7/1936 | United Kingdom . |
| 857308 | 12/1960 | United Kingdom . |
| 977138 | 12/1964 | United Kingdom . |
| 1089232 | 11/1967 | United Kingdom . |
| 1174414 | 12/1969 | United Kingdom . |
| 1216165 | 12/1970 | United Kingdom . |
| 2187202 | 9/1987 | United Kingdom . |

Primary Examiner—Deborah Yee
Attorney, Agent, or Firm—Basile and Hanlon

[57] ABSTRACT

A rolling contact parts steel has C: 0.2–0.6 wt%; Si: 0.3–2.0 wt%; Cr: 0.5–2.5 wt%; Mn: 1.7 wt% or less; O: 12 ppm or less; and the balance of Fe and an inevitable impurity. The steel produces a fine carbide without the need for a separate heat treatment. The dimensioal stability at high temperature of the steel is superior. A rolling bearing has at least one of the races and the rolling element thereof made of the steel, the steel being carburized or carbonitrided, then quenched and then, finally, tempered. The one of the races and the rolling element will not soften at a high temperature.

4 Claims, 4 Drawing Sheets

ROLLING STEEL BEARING

BACKGROUND OF THE INVENTION

1. Field of the Invention

The present invention relates to a rolling contact parts steel for use in bearings used, e.g., with automotive vehicles, agricultural machinery, construction machinery and iron-and-steel machinery, and to bearings including races (an outer race and inner race) and a rolling element at least one of which is made of the rolling contact parts steel and, more particularly, to a long life rolling contact parts steel and long life rolling bearings required for use in transmissions and engines.

2. Description of the Related Art

A rolling bearing is typically in a severe service under high surface pressure so as to experience a repeated shearing stress. In order to endure the repeated shearing stress and to secure a long rolling fatigue life (hereinafter referred to as "life", a rolling bearing with a rolling contact part which is made of high-carbon chromium bearing steel (e.g., JIS-SUJ2), then quenched and then tempered so as to have a 30–48 $H_RC$ hardness has been used.

On the other hand, there is a prior-art rolling bearing made of case hardened steel in order to increase its life. This prior-art case hardened steel rolling bearing has been made of a case hardened low-carbon steel of a good hardenability, e.g., JIS-SCR420H, -SCM420H, -SAE8620H or -SAE4320H since a hardness curve of the case hardened steel rolling bearing must be determined in accordance with an internal shearing stress distribution created by a contact surface pressure. Then, this case hardened steel rolling bearing has been sequentially carburized or carbonitrided quenched and tempered and thus has secured a required life so that the races and rolling elements of the case hardened steel rolling bearing have a 58–64 $H_RC$ surface or case hardness and a 30–48 $H_RC$ core hardness.

On the other hand, e.g., Unexamined Japanese Patent application publication No. SHO 49-114516 disclosed a prior-art bearing material. This publication provides a carburized medium-carbon steel for a rolling contact part including C: 0.36–0.50 wt % and Cr: 0.5–1.5 wt % etc., and teaches that in accordance with this carburized steel used for rolling elements, reducing a carburization time and the content of retained austenite in the carburized surface of the rolling elements increases the tenacity, hardness and fatigue limit of the case hardened rolling elements.

A typical load on a machine using a rolling bearing and the rotational speed of the machine have increased so that service conditions of the rolling bearing has become more severe, and the rolling bearing has been used under a quasi-high temperature to a high temperature, which have caused the following problems:

First, an increase in the service temperature of a rolling bearing decreases the hardness of the rolling bearing, resulting in a plastic deformation in the rolling bearing which decreases the life of the rolling bearing. Second, using a rolling bearing under high temperature can break an oil film between the races and the rolling elements of the rolling bearing so that a boundary lubrication is ready to occur which accelerates wear in the rolling contact parts of the rolling bearing. Third, even when the content of retained austenite present in the carburized surface is reduced, even a slight content of retained austenite present in the surface of a rolling contact part transforms to martensite under quasi-high to high temperatures so that the size of the rolling contact part changes which damages the dimensional stability of the rolling bearing. In particular, a severe dimensional stability of the rolling bearing has been recently required. For example, a slight dimensional error in a rolling bearing used in a jet engine or the like can cause a fatal defect. Therefore, the rolling bearing in service under quasi-high to high temperatures requires a severe dimensional stability.

Thus, in order to preferentially secure the dimensional stability of the rolling bearing in service under quasi-high to high temperatures, a high-temperature tempered type of high-carbon chromium bearing steel (e.g., JIS-SUJ2) in which the case hardened high-carbon chromium bearing steel has been high-temperature tempered so as to previously transform retained austenite in the rolling contact part of the rolling bearing to martensite and thereby increase the dimensional stability of the rolling contact part has been conventionally provided.

Precipitation-hardened steel, such as M50, high-temperature bearing high-speed steel with Cr, Mo and V, has been provided as a material for quasi-high to high temperatures rolling contact parts in addition to the high-temperature tempered type of JIS-SUJ2 steel. M50 is a high-temperature bearing high-speed steel which is high-temperature tempered to precipitate an alloy carbide so as to provide a sufficient high-temperature service strength to a rolling bearing.

In addition, in order to increase the life of a rolling bearing, the service temperature of which can be a quasi-high temperature to a high temperature, a wear-resistant carburized steel of Unexamined Japanese patent application publication No. SHO 53-37518 or a case hardened steel of Unexamined Japanese patent application publication No. SHO 54-75420 can alternatively be used, for example, as a material for a rolling contact part.

The high-temperature tempered type of JIS-SUJ2 steel increases the dimensional stability of the rolling contact part while high-temperature tempering decreases the hardness of the rolling contact part and increases the plastic deformation in the rolling contact part made of the high-temperature tempered type of JIS-SUJ2 steel so as to decrease the life of a corresponding rolling bearing. In addition, the insufficient wear resistance of the high-temperature tempered type of JIS-SUJ2 steel can remarkably accelerate wear in the rolling contact part under a boundary lubrication under a high-temperature service of the rolling bearing.

In addition, since the concentration of carbon in M50 precipitation-hardened steel is high and M50 steel precipitation-hardened steel in the stage of material for rolling contact part has macrocarbides of Cr, Mo and V, the workability in the pretreatment of M50 steel is poor. On the other hand, the macrocarbides cause a stress concentration therearound which can result in a flaking from the place of the stress concentration to thereby decrease the life of a corresponding rolling bearing with a rolling contact part made of M50 steel. Thus, M50 steel must be additionally solution heat treated at a high temperature (about 1,100° C.) in order to dissolve the macrocarbides into the matrix of M50 steel and, then, particularly heat treated in order to refine the resulting carbides. This requires separate heat treatment equipment and steps and decreases the productivity of the heat treatment.

The wear-resistant carburized steel of the Unexamined Japanese patent application publication No. SHO 53-37518 can produce macrocarbides which reduce the life of the rolling bearing. The carburized wear-resistant steel of the Unexamined Japanese patent application publication No. SHO 54-75420 can also produce macrocarbides and, in particular, is more likely to do so when the content of carbon in the carburized wear-resistant steel is large.

Conventionally, it has been known that an in-steel nonmetal inclusion, in particular, an oxide-base inclusion, deteriorates the mechanical property of a steel. The present inventors confirmed that the prior-art high-carbon chromium bearing steel, low-carbon alloy steel, case hardened steel, etc., failed to take into account a reduction of oxide-base inclusions so as to reduce the life of the rolling bearing.

Therefore, a primary object of the present invention is to provide a rolling contact parts steel which produces a fine carbide without the need for a separate heat treatment and which will not reduce the hardness of the parts even when a rolling contact part made of the rolling contact parts steel is high-temperature tempered in order to increase the dimensional stability of the rolling contact part and which produces a very slight content of an oxide-base inclusion.

Another object of the present invention is to provide a rolling bearing made of the inventive rolling contact parts steel which has a long life in service under not only room temperature but also quasi-high to high temperatures.

A further object of the present invention is to provide a rolling bearing which has a good dimensional stability even in service under high temperature.

SUMMARY OF THE INVENTION

In order to achieve the primary object, a first aspect of the present invention provides a rolling contact parts steel consisting essentially of C: 0.2-0.6 wt %; Si: 0.3-2.0 wt %; Cr: 0.5-2.5 wt %; Mn: 1.7 wt % or less; 0: 12 ppm or less; and the balance of Fe and an inevitable impurity.

This rolling contact parts steel may further include Mo: 3.0 wt % or less or V: 0.1-1.0 wt %.

In order to achieve the second-mentioned object, a second aspect of the present invention provides a rolling bearing comprising races and a rolling element, at least one of the races and the rolling element being made of the rolling contact part steel of the first aspect of the present invention. The one of the races and rolling element is carburized or carbonitrided for surface hardening heat treatment, then quenched and then finally tempered. The one of the races and the rolling element is preferably high-temperature tempered in the tempering step. The temperature of the high-temperature tempering is 240° C.-550° C.

In order to achieve the third-mentioned object, a third aspect of the present invention is that the content of retained austenite in the surface layer of the one of the races and the rolling element which has been tempered is 3 vol % or less.

One feature of the present invention is that Si and Cr, and, preferably, Mo and V are added to low or medium carbon steel to produce the rolling contact part. Adding Si, Cr, Mo and V increases the tempering softening resistance of the inventive rolling contact parts steel in order to suppress a reduction in the hardness of the rolling contact parts steel caused by tempering even when the rolling contact parts steel is tempered and, in particular, high-temperature tempered in order to reduce the content of retained austenite which adversely affects the dimensional stability of the rolling contact part. Thus, the addition of Si, Cr, Mo and V can reduce a high-temperature softening of the rolling contact part.

Since the matrix of the rolling contact parts steel is made of low or medium carbon steel, the rolling contact parts steel in the stage of material for the rolling contact part resists the production of macrocarbides. Thus, the rolling contact part steel requires neither complicated solution heat treatment for macrocarbides, nor separate high-temperature treatment equipment, e.g., a salt bath.

The sequence of carburizing or carbonitriding, then quenching and then, finally, tempering the rolling contact part precipitates fine carbides of Cr, Mo and V in the surface layer of the rolling contact part. The fine carbides present in the surface layer of the rolling contact part increase the wear resistance of the rolling contact part.

The precipitation hardening of the carbides can provide a hardness for the rolling contact part required under high temperature so that the rolling contact part secures a hardness required under quasi-high to high temperatures. Thus, the precipitation hardening of the carbides remarkably reduces a plastic deformation in the rolling contact part and avoids a tempering softening of the rolling contact part. The fine carbides reduce a stress concentration in the rolling contact part so that the rolling contact part of the present invention resists the occurrences of a flaking and a crack to thereby increase the life of a rolling bearing comprising the rolling contact part of the present invention. In addition, fine carbides present in the surface layer of the rolling contact part increases the wear resistance of the rolling contact part. Reducing the content of in-steel oxygen as much as possible avoids the formation of an oxide-base inclusion.

Since the rolling contact part of rolling bearing of the present invention is made of the inventive rolling contact parts steel which is carburized or carbonitrided, then quenched and then, finally, tempered, the rolling contact part has a superior tempering softening resistance. The production of a fine carbide prevents a reduction in the hardness of the rolling contact part even when a rolling bearing comprising the rolling contact part of the present invention is in service under quasi-high to high temperatures. The production of the fine carbide also provides a superior wear-resistance for the rolling contact part so that the life of the rolling bearing is increased under a service not only at room temperature; but, also, at quasi-high to high temperatures. The production of the oxide-base inclusion is reduced as much a possible so that the life of the rolling bearing is increased.

Since the rolling contact part of the rolling bearing of the present invention is used under high temperature, the average content of retained austenite in the surface layer and the core of the rolling contact part is 3 vol % or less. Thus, the dimensional stability of the rolling contact part of the rolling bearing in service at quasi-high to high temperatures is good. Carburizing or carbonitriding the rolling contact part may be selected for the surface hardening heat treatment In particular, carbonitriding is preferable because N, i.e., nitrogen, increases the tempering softening resistance of the rolling contact parts steel.

High-temperature tempering a prior-art bearing steel and a prior-art case hardened steel, e.g., at 250° C., insufficiently provides a surface hardness for the rolling contact part which is below 60 H$_R$C so that the surface hardness of the rolling contact part will not meet with the service requirement for the rolling bearing. On the other hand, carbonitriding the rolling contact part of the rolling contact parts steel of the present invention for surface hardening heat treatment provides a surface hardness for the rolling contact part which will meet the requirement for rolling bearing because of the tempering softening resistance increasing operation of N even when the rolling contact part is high-temperature tempered. Thus, a sufficient life of the rolling bearing comprising the rolling contact part of the present invention can be secured even when high-temperature tempering of the rolling contact part is conducted in order to increase the dimensional stability of the rolling contact part.

Herein, the surface layer of the present invention is defined as a Zo to 2Zo deep layer of each of the races and the rolling element of the rolling bearing from a rolling contact surface of the rolling contact part, when Zo represents a position (i.e., depth) of maximum shearing stress. The preferred embodiments of the present invention have, e.g., about 0.2–0.5 mm order thick surface layers. The depth of the surface layer is computed from a value of a surface pressure applied to the rolling contact surface of each of the rolling contact parts, i.e., the races and the rolling element.

The present invention can produce fine carbides in the surface layer of the rolling contact parts steel without the need for a separate heat treatment.

The high-temperature tempered rolling contact parts steel of the present invention can provide a long life rolling bearing in service under both room temperature and high temperature, as well as a superior dimensional stability to a rolling bearing in service under quasi-high to high temperatures.

DESCRIPTION OF THE INVENTION

Figure 1:
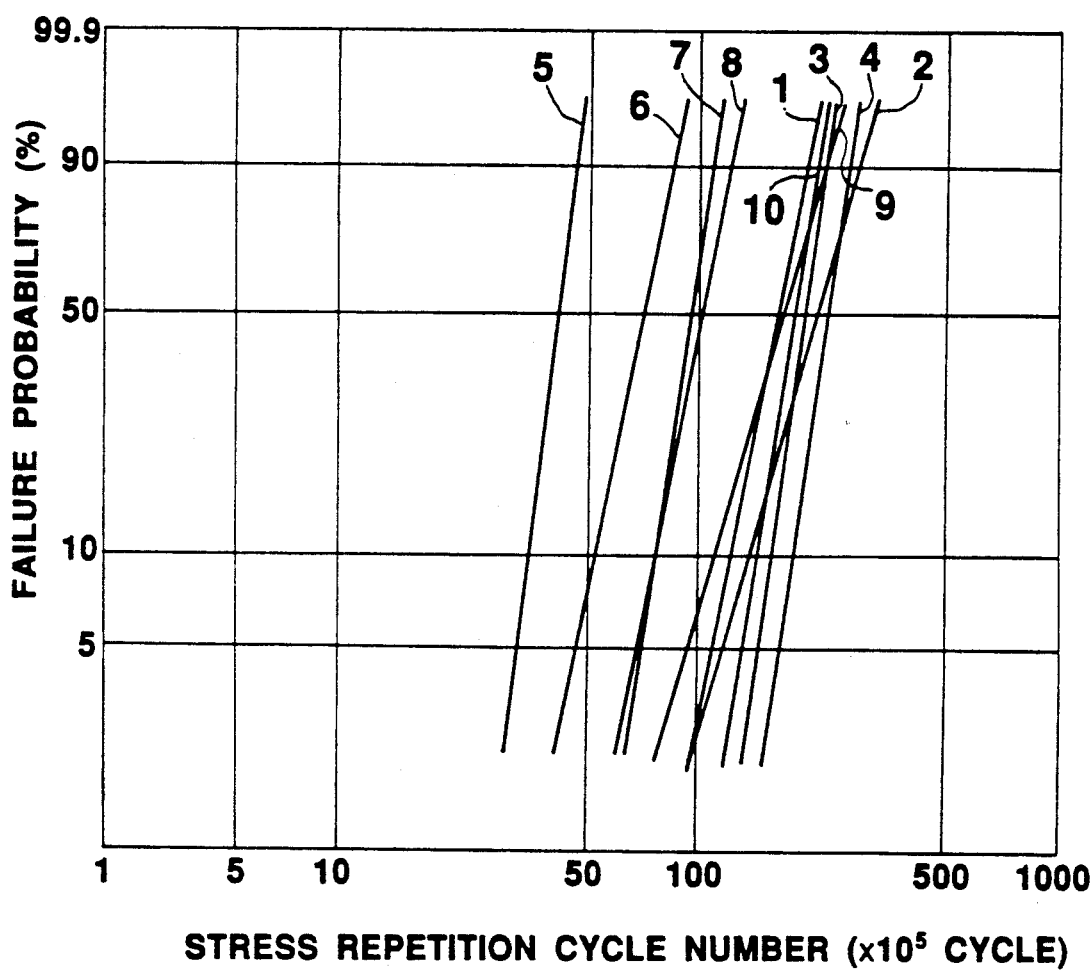
FIG. 1 is a characteristic graph of a rolling thrust bearing in service at 130° C., the graph representing the results of a rolling thrust bearing life test in terms of a relationship between the stress repetition cycle number and the failure probability of the rolling thrust bearing.

The operation of the included elements of the rolling contact parts steel of the present invention and the critical significance of the contents of the included elements will be described hereinafter.

Cr: 0.2–0.6 wt %

Carbon was required to increase the hardness of a rolling contact part which had been quenched and then tempered. The captioned values represent the content of carbon present in the core of the rolling contact part since carburizing or carbonitriding a rolling contact part made of the rolling contact parts steel increased a case carbon concentration in the surface layer of the rolling contact part.

Above 0.6 wt % content of carbon caused a macrocarbide in the stage of material of the rolling contact parts steel for the rolling contact part to thereby decrease the tenacity and rupture strength of the rolling contact part. Above 0.6 wt % content of carbon also significantly increased the content of retained austenite to thereby change the dimensions of the rolling contact part at high temperature so as to deteriorate the dimensional stability of the rolling contact part.

On the other hand, below 0.2 wt % content of carbon required a significantly longer time for carburization or carbonitriding which decreased the heat-treatment productivity of the rolling contact part.

For example, increasing a carbonitriding temperature in order to reduce carbonitriding time increased the decomposition of NH$_3$ gas so that nitrogen entered the rolling contact part with difficulty. Thus, the carbonitriding temperature was increased only to 820° C.–880° C. Therefore, in order to secure a carbon weight percentage which provided a sufficient hardness of the rolling contact part through a depth at which a shearing stress was loaded when the rolling bearing received a load, the carbonitriding time was increased, which was costly.

On the other hand, the content of oxygen producing the oxide-base inclusion harmful to an increase of the life of the rolling bearing increased as the content of carbon decreased, which is disadvantageous to an increase in the life of the rolling bearing. The present invention produced a low-oxygen high-clean steel from a medium-carbon steel (i.e., carbon: 0.2–0.6 wt %). Thus, the content of carbon was preferably 0.3–0.6 wt % and, more preferably, 0.35–0.45 wt %.

Si: 0.3–2.0 wt %

In-steel Si was effective to solution reinforcement and an increase in the tempering softening resistance of the rolling contact part. The content of Si had to be 0.3 wt % or more in order to exert the operation of Si. However, the greater the content of Si, the lower the mechanical strength and machinability of the rolling contact part. In addition, Si has carburization and carbonitriding impedances. Thus, the upper limit of the content of Si was 0.2 wt %.

Cr: 0.5–2.5 wt %

Cr was effective to an increase in the tempering softening resistance of the rolling contact part.

A precipitation hardening producing uniformly distributed fine chromium carbides provided a sufficient surface hardness to the rolling contact part and increased the tenacity of the matrix of the rolling contact part even when the rolling contact part was high-temperature tempered. Hard and fine chromium carbides increased the wear resistance of the rolling contact part. Since Cr produces a chromium carbide which increases the content of carbon in a carbonitrided layer of the rolling contact part, Cr increased the carbonitridability of the rolling contact parts steel even when the rolling contact parts steel included a large content of Si which impedes carburization.

In order to exert the above operations of Cr and to secure a required surface hardness (especially 61-70 $H_RC$) of the rolling contact part, the lower limit of the content of Cr was 0.5 wt %. On the other hand, above 2.5 wt % content of Cr insufficiently produced fine carbides which were uniformly distributed in the rolling contact part and produced a macrocarbide in the rolling contact part in the stage of material of the rolling contact parts steel for the rolling contact part so as to cause a stress concentration about the macrocarbide which decreased the life of the rolling bearing.

An unnecessarily increased content of Cr is costly. Refining the macrocarbide required a high-temperature quenching of the rolling contact part which reduced the productivity of the heat treatment. Thus, the upper limit of the content of Cr was 2.5 wt %. The content of Cr was preferably 1.8-2.5 wt %.

Mo: 3.0 wt % or less

Mo was as effective for increasing the tempering softening resistance of the rolling contact part as Cr was Mo was also required to produce the carbides in the surface layer of the rolling contact part and was effective to an improvement in the hardenability of the rolling contact part. Therefore, the rolling contact parts steel may include Mo if desired.

However, above 3.0 wt % content of Mo insignificantly increased the above operations and produced a macrocarbide in the rolling contact part in the stage of material for the rolling contact part so that the life of the rolling bearing was decreased. Thus, the upper limit of the content of Mo was 3.0 wt %.

Mn: 1.7 wt % or less

In-steel Mn served as both a deoxidizer and a desulfurizing agent in melting a steel and largely contributed to an improvement in the hardenability of the rolling contact part. Mn is also inexpensive. However, a large content of Mn was likely to produce a large content of a nonmetal inclusion which decreased the life of the rolling bearing, increased the hardness of the rolling contact part and thereby decreased the forgeability and machinability of the rolling contact parts steel. Thus, the upper limit of the content of Mn was 1.7 wt %.

The content of Mn was preferably 0.3-1.6 wt %.

O: 12 ppm or less

Since oxygen produced an oxide or oxide-base nonmetal inclusion (especially $Al_2O_3$ which decreased the life of the rolling bearing, the content of oxygen was required to be as low as possible Thus, the upper limit of the content of oxygen was 12 ppm. It was preferably 9 ppm

Al: 300 pom or less

Al produced an oxide or oxide-base nonmetal inclusion, e.g., $Al_2O_3$, which is harmful to the life of the rolling bearing. However, Al itself served to prevent a coarsening of crystal grains, so that the content of Al may be up to 300 ppm.

V: 0.1-1.0 wt %

V was significantly effective to an improvement in the tempering softening resistance of the rolling contact part and precipitated in grain boundaries to thereby suppress a coarsening of the crystal grains and refine the crystal grains. V also bonded with in-steel carbon to produce a fine carbide. Since adding V increased the hardness of the surface layer of the rolling contact part and to thereby increase the wear resistance of the rolling contact part, the rolling contact parts steel may include V if desired. Since a 0.1 wt % or more content of V had significant effect, the lower limit of the content of V was 1.0 wt %. On the other hand, above 1.0 wt % content of V precipitated vanadium carbide in grain boundaries so as to deteriorate the workability and various mechanical properties of the rolling contact part. In addition, V is costly. Thus, the upper limit of the content of V was 1.0 wt %.

In the present invention, the rolling contact parts steel may possibly include other elements as an inevitable impurity in addition to the above elements. Ti, S and P exemplify the inevitable impurity.

Ti

Ti appeared as a nonmetal compound in the form of TiN. Since the hardness of TiN is high and the plasticity thereof is low, TiN was a source of stress concentration which decreased the life of the rolling bearing. Thus, the content of Ti was decreased as much as possible. The content of Ti was preferably 40 ppm.

P

Since P decreased the impact resistance of the rolling contact parts steel, the content of P was required to be decreased as much as possible. Thus, the content of P was preferably 200 ppm or less.

S

S caused a sulfide or sulfide-base nonmetal inclusion, e.g., Mns. MnS had a low hardness and a high plasticity so as to cause a cracking during a preworking, e.g., rolling and forging, of the rolling contact part. The content of S was required to be decreased as much as possible s that cracking in the rolling contact part during preworking, e.g., forging, was prevented and a harder working of the rolling contact part could be conducted. Thus, the content of S was preferably 80 ppm or less.

In the present invention, the sequence of carburizing or carbonitriding, then quenching and then, finally, tempering at least one of the races and the rolling element produced fine carbides in the surface layer of the one of the races and the rolling element.

These carbides were hard and provided a good wear resistance to the rolling contact part to thereby secure the required hardness of the rolling contact part of the rolling bearing in a service at quasi-high to high temperatures and to increase the life of the rolling bearing. In addition, these carbides, which are fine, prevented a stress concentration by a load imposed on the rolling bearing to thereby increase the life of the rolling bearing.

Carbides of the present invention comprise, e.g., $Cr_7C_3$, $Cr_3C_6$, $Mo_2C$, VC, $V_4C_3$, $Fe_3C$ and double carbides thereof.

Sizes of the carbides of the present invention (defined as ½ of the total of the maximum diameter and minimum diameter of each carbide) are preferably 0.5-1.0 μm.

The content of the carbides present in the surface layer of the rolling contact part of the present invention are preferably 20-50 vol %.

A desired surface hardness of the rolling contact part is 61-70 $H_RC$ in order to increase the life of the rolling bearing. Below 20 vol % content of the carbides failed to provide the desired surface hardness. On the other hand, above 50 vol % content of the carbides unpreferably caused fine carbides to cohere and thereby coarsen so that the cohering carbides caused a stress concentration. Thus, the content of the carbides present in the surface layer of one of the rolling contact parts was 20-50 vol %. This provided the rolling contact part with a surface hardness as high as 61-70 $H_RC$.

In addition, the carburization and carbonitriding of the blank of the rolling contact part produced the cores of carbides when the rolling contact part was heated above an $A_1$ transformation temperature and the subsequent quenching and tempering precipitated the fine carbides in the surface layer of the rolling contact part. In addition, providing the 0.6-0.8 wt % content of dissolved carbon and concurrently the 2.5-3.8 wt % total content of carbon present in the surface layer of the rolling contact part provided 20-50 vol % content of the carbides present in the surface layer of the rolling contact part.

In accordance with the present invention, carburizing or carbonitriding the rolling contact parts steel of the present compositions provided 0.6-0.8 wt % content of dissolved carbon or carbon-and-nitrogen with a 2.5-3.8 wt % total content of carbon present in the surface layer of the rolling contact part. Quenching and then high-temperature tempering the rolling contact part made of the resulting alloy steel precipitated the fine carbides in the surface layer of the rolling contact part and provided 3 vol % content of retained austenite present in the surface layer and the core thereof. Since because above 3 vol % content of retained austenite transformed to martensite at high temperature which significantly changed the dimensions of the rolling contact part, the average content of retained austenite should be preferably 3 vol % or less.

Since an insufficiently low temperature of tempering the blank of the rolling contact part insufficiently transformed retained austenite to martensite, the temperature of the tempering was about 240° C.-550° C. and, preferably, 250° C.-300° C.

Thus, the present invention can provide the long life rolling bearing even when the rolling bearing is in a service at quasi-high to high temperatures (i.e., about 120° C.-550° C.).

DESCRIPTION OF THE PREFERRED EMBODIMENTS

The preferred embodiments of the present invention will now be described.

Embodiment 1

Sequentially carburizing or carbonitriding, quenching and then tempering the tested materials A and B of the rolling contact parts steels of the present invention and tested materials C to K of controls provided the disc-shaped test pieces Nos. 1-17 which were applicable to both of the races of a rolling thrust bearing. Table 1 shows the compositions of the tested materials A to K.

TABLE 1

| Tested material | C | Si | Mn | Cr | Mo | V | O | S | P |
|---|---|---|---|---|---|---|---|---|---|
| A | 0.41 | 1.21 | 1.13 | 2.19 | 2.14 | — | 9 | 60 | 130 |
| B | 0.40 | 1.20 | 1.08 | 2.22 | 2.06 | 0.2 | 9 | 50 | 130 |
| C | 1.02 | 0.25 | 0.36 | 1.47 | — | — | 11 | 40 | 120 |
| D | 0.20 | 0.25 | 0.72 | 1.06 | — | — | 10 | 60 | 130 |
| E | 0.41 | 1.19 | 1.09 | 0.68 | 2.10 | — | 9 | 40 | 120 |
| F | 0.42 | 1.20 | 1.10 | 2.13 | — | — | 10 | 40 | 120 |
| G | 0.42 | 1.21 | 1.10 | 3.24 | 3.30 | — | 9 | 50 | 120 |
| H | 0.42 | 1.21 | 1.10 | 2.30 | 2.05 | 1.1 | 9 | 50 | 130 |
| I | 0.42 | 2.5 | 1.08 | 2.8 | 2.10 | — | 9 | 50 | 130 |
| J | 0.41 | 1.2 | 2.03 | 2.9 | 2.05 | — | 9 | 50 | 130 |
| K | 0.41 | 1.19 | 1.10 | 2.20 | 2.11 | 0.07 | 9 | 50 | 130 |

Contents of O, S, and P are represented in ppm and those of the other elements in wt %.

Table 2 shows the conditions of heat treatment for each test piece. The conditions of heat treatment for the test piece No. 1 were as follows: A direct quenching of a carburization was conducted under the atmosphere of Rx gas + an enriching gas at 950° C. for about 3 hours. Then, an oil quenching was conducted followed by a high-temperature tempering of 300° C. ×2 hours.

The test pieces Nos. 5 and 13 were quenched without carburization and carbonitriding. The other test pieces Nos. 2-4, 6-12 and 14-17 were carburized or carbonitrided under varied conditions and tempered at varied temperatures. The test pieces Nos. 1-10 and 15-17 were high-temperature tempered in order to reduce the content of retained austenite. The test pieces Nos. 11-14 were tempered at a normal temperature. A carbonitriding instead of carburization was conducted under the atmosphere of Rx gas + an enriching gas +5% ammonia.

Then, the surface hardnesses in $H_RC$ and the content of retained austenite of the test pieces Nos. 1-17 were measured. Table 2 shows the results of these measurements.

The $L_{10}$ lives of the test pieces Nos. 1-17 represented by a stress repetition cycle number were measured. In order to obtain a high-temperature life characteristic for each of the test pieces Nos. 1-17, the life of the test piece was measured at a 130° C. and at about 50° C.-60° C. room temperature. The lives at 130° C. of the test pieces Nos. 1-10 and 15-17 and the lives at room temperature of the test pieces Nos. 1-14 were measured. A time at which each test piece experienced a visible flaking or crack was defined as the expiration of the life of the test piece. The conditions of the life measurement were as follows:

Testing machine: Thrust testing machine described on pages 10-21 of "Special Steels Manual", 1st edition edited by Electrosteelmaking Research Institute and published by Rikohgakusha on May 25, 1965;

Lubricating oil: FKB oil RO 150 in the case of 130° C. life test and FKB oil RO 80 in the case of room temperature life test;

Maximum surface pressure: 560 kg/mm² in the case of 130° C. life test and 530 kg/mm² in the case of room temperature life test;

Stress repetition cycle number: 3,000 cpm.

Table 2 shows the lives of the test pieces Nos. 1-17.

TABLE 2

| Test piece No. | Tested material | Conditions of heat treatment Carburization (Carbonitriding) | Tempering | Average Hardness $H_RC$ | $\tau_R$ (wt %)[*1] | $L_{10}$ Life at 130° C. (cycle) Values in [ ]: $L_{10}$ life at room temperature |
|---|---|---|---|---|---|---|
| 1 | A | 950° C. × 3 hr | 300° C. × 2 hr × 1 time | 61.2 | 2–3 | $1.3 \times 10^7$ |
| 2 | A | (880° C. × 3 hr) | 300° C. × 2 hr × 1 time | 61.3 | 2–3 | $1.4 \times 10^7$ |
| 3 | B | 950° C. × 3 hr | 300° C. × 2 hr × 1 time | 61.6 | 2–3 | $1.6 \times 10^7$ |
| 4 | B | (880° C. × 3 hr) | 300° C. × 2 hr × 1 time | 61.7 | 2–3 | $1.8 \times 10^7$ |
| 5 | C | 840° C. × 30 min[*2] | 240° C. × 2 hr × 1 time | 59.1 | 0–1 | $3.1 \times 10^6$ |
| 6 | D | 930° C. × 3 hr | 240° C. × 2 hr × 1 time | 59.4 | 1–2 | $5.1 \times 10^6$ |
| 7 | E | 950° C. × 3 hr | 300° C. × 2 hr × 1 time | 60.2 | 2–3 | $7.5 \times 10^6$ |
| 8 | F | 950° C. × 3 hr | 300° C. × 2 hr × 1 time | 59.9 | 2–3 | $7.4 \times 10^6$ |
| 9 | G | 950° C. × 3 hr | 300° C. × 2 hr × 1 time | 61.1 | 2–3 | $1.2 \times 10^7$ |
| 10 | H | 950° C. × 3 hr | 300° C. × 2 hr × 1 time | 61.1 | 2–3 | $1.5 \times 10^7$ |
| 11 | A | 950° C. × 3 hr | 220° C. × 2 hr × 1 time | 64.1 | 4–6 | $[1.5 \times 10^8]$ |
| 12 | B | 950° C. × 3 hr | 220° C. × 2 hr × 1 time | 64.1 | 4–6 | $[1.7 \times 10^8]$ |
| 13 | C | 840° C. × 30 min[*2] | 160° C. × 2 hr × 1 time | 62.1 | 8–10 | $[9.8 \times 10^6]$ |
| 14 | D | 930° C. × 3 hr | 160° C. × 2 hr × 1 time | 61.5 | 4–6 | $[4.7 \times 10^7]$ |
| 15 | I | 950° C. × 3 hr | 300° C. × 2 hr × 1 time | 61.0 | 2–3 | $4.0 \times 10^6$ |
| 16 | J | 950° C. × 3 hr | 300° C. × 2 hr × 1 time | 61.4 | 2–3 | $6.3 \times 10^6$ |
| 17 | K | 950° C. × 3 hr | 300° C. × 2 hr × 1 time | 61.2 | 2–3 | $1.3 \times 10^7$ |

[*1]Each value represents an average of $\tau_R$ S wt % of the surface layer and the core.
[*2]Quenching was conducted without carburization and carbonitriding A relationship at 130° C. or room temperature between a stress repetition cycle number and a failure probability of a disc-shaped test piece due to a flaking or crack caused by a repeated stress in the disc-shaped test piece was tested with a plurality of disc-shaped test pieces made of each of the test pieces Nos. 1-10. FIG. 1 shows the result of this test.

Figure 2:
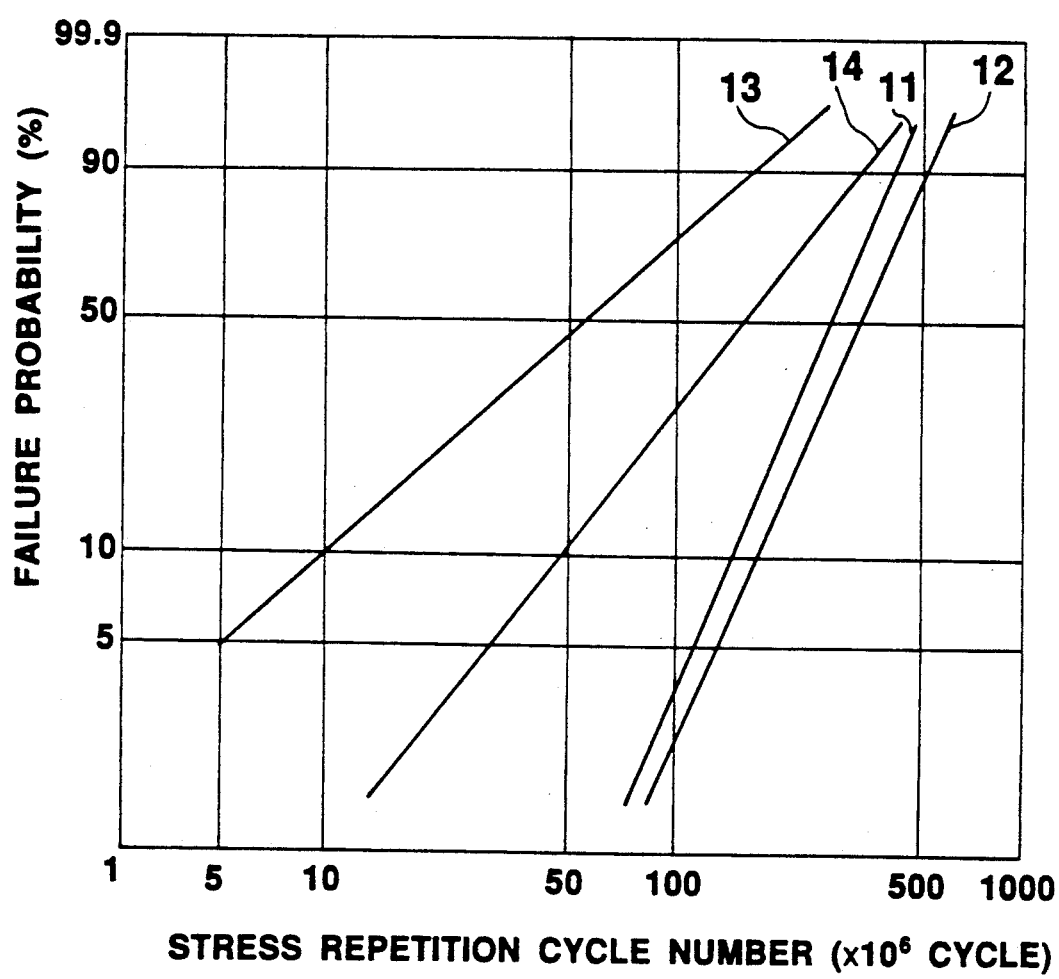
FIG. 2 is a characteristic graph of a rolling thrust bearing in service at room-temperature, the graph representing the results of a rolling thrust bearing life test in terms of a relationship between the stress repetition cycle number and the failure probability of the rolling thrust bearing.

On the other hand, a relationship at room temperature between a stress repetition cycle number and a failure probability of a disc-shaped test piece made of each of the test pieces Nos. 11-14 was tested in essentially the same manner as in the case of FIG. 1. FIG. 2 shows the result of this test. In FIGS. 1 and 2, the reference numerals indicate corresponding test pieces.

Since the test piece No. 1 made of the tested material A precipitated fine carbides in the surface layer thereof and included the elements which increased the tempering softening resistance of test piece No. 1, as shown in Table 2, the surface hardness of the test piece No. 1 was high-temperature tempered. In addition, the high-temperature tempering decreased the content of retained austenite to be as low as 2-3 wt %, so that the dimensional stability in the 130° C. life test of the test piece No. 1 was good.

Since the surface hardness of the test piece No. 1 was good and the carbide present in the surface of the test piece No. 1 was fine, the results of the 130° C. life test for the test piece No. 1 represented good values. Thus, as seen in FIG. 1, the high-temperature failure probability to stress repetition cycle number of the test piece No. 1 was low.

The test piece No. 2 was made of the same tested material A as the test piece No. 1. The test piece No. 2 differed from the test piece No. 1 in that the test piece No. 2 was not carburized; but was carbonitrided.

The $H_RC$ hardness of the test piece No. 2 was higher than that of the test piece No. 1. The content of retained austenite of the test piece No. 2 was lower than that of the test piece No. 1. The life at 130° C. of the test piece No. 2 was shorter than that of the test piece No. 1. As shown in FIG. 1, the 130° C. failure probability to stress repetition cycle number of the test piece No. 2 was lower than that of the test piece No. 1.

The test piece No. 3 was made of the tested material B. The tested material B differed from the tested material A in that the tempering softening resistance of the tested material B was higher than that of the tested material A and included a proper content of V producing and refining a vanadium carbide.

Since the tested material B included the same elements which increased the tempering softening resistance as the tested material A and precipitated the fine carbides in the surface layer thereof, the hardness and life of the test piece No. 3 were increased more than those of the test pieces Nos. 1 and 2 and the 130° C. failure probability of the test piece No. 3 was as low as those of the test pieces Nos. 1 and 2. In addition, since the test piece No. 3 was high-temperature tempered, the content of retained austenite of the test piece No. 3 was also as low as those of the test pieces Nos. 1 and 2.

The test piece No. 4 was also made of the tested material B. Since the test piece No. 4 differed from the test piece No. 3 only in that the test piece No. 4 was not carburized; but was carbonitrided, the test piece No. 4 had the same good results as the test piece No. 3.

The test piece No. 5 which was made of the tested material C, a high-carbon chromium bearing steel of JIS-SUJ2 provided a control. Since high-temperature tempering the tested material C reduced the content of retained austenite, the contents of elements, e.g., Si, of the tested material C which increased the tempering softening resistance were low, and the content of carbon of the tested material C exceeded the upper limit of the present invention so that the carbides present in the surface layer of the tested material C were coarsened in the stage of material for rolling contact part to thereby reduce the tenacity and rupture strength of the tested material C. Since the tested material C was neither carburized nor carbonitrided, the degree of the precipitation hardening of the carbides was low so that the hardness of the tested material C required at quasi-high to high temperatures failed to be obtained. Thus, the 130° C. failure probability of the tested material C was greatly increased as shown in FIG. 1.

The test piece No. 6 which was made of the tested material D, a case hardened steel of SCR420, provided a control. Since the content of Si of the tested material D which increased the tempering softening resistance was low, the hardness after high-temperature tempering of the tested material C was low and the life thereof was short. As shown in FIG. 1, the 130° C. failure probability of the tested material D was high.

Since the respective test pieces Nos. 7 and 8 were made of the tested materials E and F, the post-tempering hardnesses of the test pieces Nos. 7 and 8 were high and the lives at 130° C. thereof and the 130° C. failure probabilities thereof were lower than those of the test pieces Nos. 5 and 6, as shown in FIG. 1.

The test piece No. 9 was made of the tested material G, the contents of Cr and Mo of which exceeded the upper limits of the present invention. Large contents of Cr and Mo can produce macrocarbides thereof. Since the test piece No. 9 included the macrocarbides unlike the test piece No. 1, the degree of the stress concentration in the test piece No. 9 was high so as to thereby slightly reduce the life of the test piece No. 9. On the other hand, adding contents of Cr and Mo exceeding the upper limits of the present invention was inefficient and costly.

The test piece No. 10 was made of the tested material H, the content of V of which exceeded the upper limit of the present invention. As shown in Table 2, the hardness and life of the test piece No. 10 was essentially equal to those of the test pieces Nos. 1–4 and 9 even when the content of V of the test piece No. 10 exceeded the upper limit of the present invention. The 130° C. failure probability of the test piece No. 10 was also essentially equal to that of the test pieces Nos. 1–4 and 9. However, adding an amount of V exceeding the upper limit of the present invention is costly.

The test piece No. 11 was made of the same tested material A as the test piece No. 1 but differed from the test piece No. 1 in that the test piece No. 11 was not high-temperature tempered; but was tempered at the normal temperature. Thus, the content of retained austenite of the test piece No. 11 was greater than those of the test pieces Nos. 1–10. However, since the test piece No 11 included the elements, e.g., Si, which increased the tempering softening resistance, the post-tempering hardness of the test piece No. 11 was good. The life at room temperature of the test piece No. 11 was also good. As shown in FIG. 2, the room-temperature failure probability of the test piece No. 11 was good.

The test piece No. 12 was made of the same tested material B as the test piece No. 3 but differed from the test piece No. 3 in that the test piece No. 12 was not high-temperature tempered; but was normally tempered. Thus, the hardness and life of the test piece No. 12 were as good as the test piece No. 11. In addition, since the test piece No. 12 included V, the post-tempering hardness and life of the test piece No. 12 exceeded that of the test piece No. 11. The room-temperature failure probability of the test piece No. 12 was better than that of the test piece No. 11.

The test piece No. 13 was made of the same JIS-SUJ2 steel as the test piece No. 5 but differed from the test piece No. 5 in that the test piece No. 5 was high-temperature tempered while the test piece No. 13 was tempered at the normal temperature.

Since the test piece No. 13 insufficiently precipitated fine carbides in the surface layer thereof, the hardness and room-temperature life of the test piece No. 13 were lower than that of the test pieces Nos. 11 and 12. As shown in FIG. 2, the room-temperature failure probability of the test piece No. 13 was also lower than that of the test pieces Nos. 11 and 12.

The test piece No. 14 was made of the same SCR420 case hardened steel as the test piece No. 6 but differed from the test piece No. 6 in that the test piece No. 14 was not high-temperature tempered; but was tempered at the normal temperature.

Since the content of Si of the test piece No. 14 and the content of Cr thereof, which increased the tempering softening resistance and caused the production of fine carbides, were below the lower limits of the present invention, the hardness and life of the test piece No. 14 were lower than that of the test pieces Nos. 11 and 12. As shown in FIG. 2, the room-temperature failure probability of the test piece No. 14 was higher than that of the test pieces Nos. 11 and 12.

The test piece No. 15 was made of the tested material I, the content of Si of which exceeded the upper limit of the present invention. The depth of the carburized layer of the test piece No. 15 was greatly reduced as the content of Si of the test piece No. 15 was high so that the life of the test piece No. 15 was reduced.

The test piece No. 16 was made of the tested material J, the content of Mn of which exceeded the upper limit of the present invention. The content of a nonmetal inclusion of the test piece No. 16 was greatly increased as the content of Mn thereof was high so that the life of the test piece No. 16 was reduced.

The test piece No. 17 was made of the tested material K, the content of V of which was below the lower limit of the present invention. The effect of adding V was insignificant.

Embodiment 1 was conducted under a life test at 130° C. as shown in Table 2. However, a life test at a higher temperature, e.g., about 200° C.–500° C., also produced essentially the same good results as shown in Table 2.

In the life test described with reference to Table 2, the life of each of the disc-shaped test pieces Nos. 1–7 was measured. On the other hand, a life test for test pieces in the form of a rolling element made of the same materials as listed in Table 2 was conducted and resulted in essentially the same measurements as in the case of the life test of the disc-shaped test pieces.

Embodiment 2

The tested materials L to S of the compositions of Table 3 were made from ingot steels, then sequentially carburized or carbonitrided, quenched and tempered in accordance with the conditions of Table 4.

TABLE 3

| Tested material | C | Cr | Si | Mn | Mo | O*1 | Fe |
|---|---|---|---|---|---|---|---|
| L | 0.41 | 1.5 | 0.4 | 0.6 | — | 7 | balance |
| M | 0.40 | 1.5 | 0.4 | 0.6 | 1.2 | 8 | " |
| N | 0.41 | 1.5 | 0.4 | 0.6 | — | 7 | " |
| O | 0.41 | 1.5 | 0.4 | 0.6 | — | 7 | " |
| P | 1.0 | 1.5 | 0.3 | 0.3 | — | 7 | " |
| Q | 1.0 | 1.5 | 0.3 | 0.3 | — | 7 | " |
| R | 0.2 | 1.1 | 0.3 | 0.7 | — | 12 | " |
| S | 0.2 | 1.1 | 0.3 | 0.7 | — | 13 | " |

The values in the columns of C, Cr, Si, Mn, Mo and Fe represent the contents of the elements in wt %. The values in the column of oxygen represent the contents of oxygen in ppm (*1). The values in the column of carbon (C) represent the contents of carbon in the stages of previous material for the tested materials. Contents of carbon (C) of the tested materials L to O, R and S which were carburized were 0.8–1.0 wt %. The contents of carbon (C) of the tested materials L to O, R and S which were carbonitrided were 0.7–0.9 wt %.

TABLE 4

| | Heat treatment | | Surface hardness ($H_RC$) | Average content of retained austenite (vol %) |
|---|---|---|---|---|
| | Surface heat treatment | Tempering (°C.) | | |
| L | carbonitriding | 260 | 61.2 | 0 |
| M | carbonitriding | 260 | 62.1 | 0 |
| N | carbonitriding | 160 | 62.1 | 6 |
| O | carburization | 260 | 59.8 | 0 |
| P | — | 260 | 59.0 | 0 |
| Q | — | 160 | 61.8 | 9 |
| R | carburization | 260 | 59.6 | 0 |
| S | carburization | 160 | 62.0 | 4 |

The carbonitriding of Table 4 was conducted under the atmosphere of Rx gas + a 1.5 vol % enriching gas +3-5 vol % ammonia at 820° C.-850° C. for about 3 hours. Then, an oil quenching was conducted from the temperature of the carbonitriding to 60° C. and then each of the temperings was once conducted at the temperatures of Table 4 for 2 hours.

On the other hand, the carburization of Table 4 was conducted under the atmosphere of Rx gas + an enriching gas at 930° C. for about 3 hours. Then, this temperature was decreased to 830° C. Then, a soaking of 830° C. ×30 minutes was conducted. Then, oil quenching was conducted.

On the other hand, tested materials which were neither carburized nor carbonitrided were soaked in the atmosphere of Rx gas at 830° C. and then oil quenched.

The tested materials L and M belong to a rolling contact parts steel of Embodiment 2 of the present invention. The tested material N provided a rolling contact parts steel, a tempering temperature of which was low. The tested material O provided a rolling contact parts steel which was not carbonitrided; but was carburized. The tested material P provided a control made of high-carbon bearing steel II (i.e., JIS-SUJ2) which was not carbonitrided. The tested material Q provided a control made of the JIS-SUJ2 high-carbon bearing steel, a tempering temperature of which was not high. The tested material R made of a low-carbon steel which was not carbonitrided; but was carburized provided a rolling contact parts steel, the oxygen content of which was 12 ppm. The tested material S which was made of a carburized low-carbon steel, a tempering temperature of which was not high, provided a control, the oxygen content of which was 13 ppm exceeding the upper limit of the present invention.

The $H_RC$ surface hardness and an average content of retained austenite of each of the tested materials L to S were measured. Since the content of retained austenite of each of the tested materials which have been carbonitrided or carburized has a predetermined gradient through the thickness of the surface layer, i.e., distance between the surface and core of the tested material, an average of the contents of retained austenite of the overall surface layer was employed as the content of retained austenite of each of the tested materials. Table 4 represents the results of the measurement of the surface hardness and the content of retained austenite.

The average content of retained austenite of the tested material L was zero vol % due to high-temperature tempering. However, the tested material L secured a sufficient surface hardness (i.e., 60 $H_RC$ or more) since the tested material L, which was high-temperature tempered, was carbonitrided.

The tested material M had properties similar to those of the tested material L. In particular, since the tested material M differed from the tested material L only in that the tested material M included Mo, the surface hardness of the tested material M was higher than that of the tested material L. Since the tempering temperature of the tested material O equalled that of the tested material L, the content of retained austenite of the tested material O was zero. In addition, t he post-tempering surface hardness of the tested material O which had not been carbonitrided; but was carburized was slightly lower than that of the tested material O which had been carbonitrided.

The tested material P provided a JIS-SUJ2 steel. High-temperature tempering the tested material P in order to transform retained austenite of the tested material P into martensite softened the tested material P. Thus, the tested material P which had been high-temperature tempered failed to secure a 60 $H_RC$ or more surface hardness required for increasing the life of the rolling bearing.

The tested material Q also provided a JIS-SUJ2 steel. Since the tested material Q avoided the softening operation of high-temperature tempering, the surface hardness of the tested material Q was higher than 60 $H_RC$. However, the retained austenite of the tested material Q remained to thereby deteriorate the dimensional stability of the rolling contact part made of the tested material Q.

The surface hardness of the tested material R which was carburized was slightly lower than that of the tested material R which was carbonitrided.

The life of the tested material S, the oxygen content of which exceeded the upper limit of the present invention, was slightly shorter than those of the tested materials L and M, the oxygen contents of which were below 9 ppm.

Figure 3:
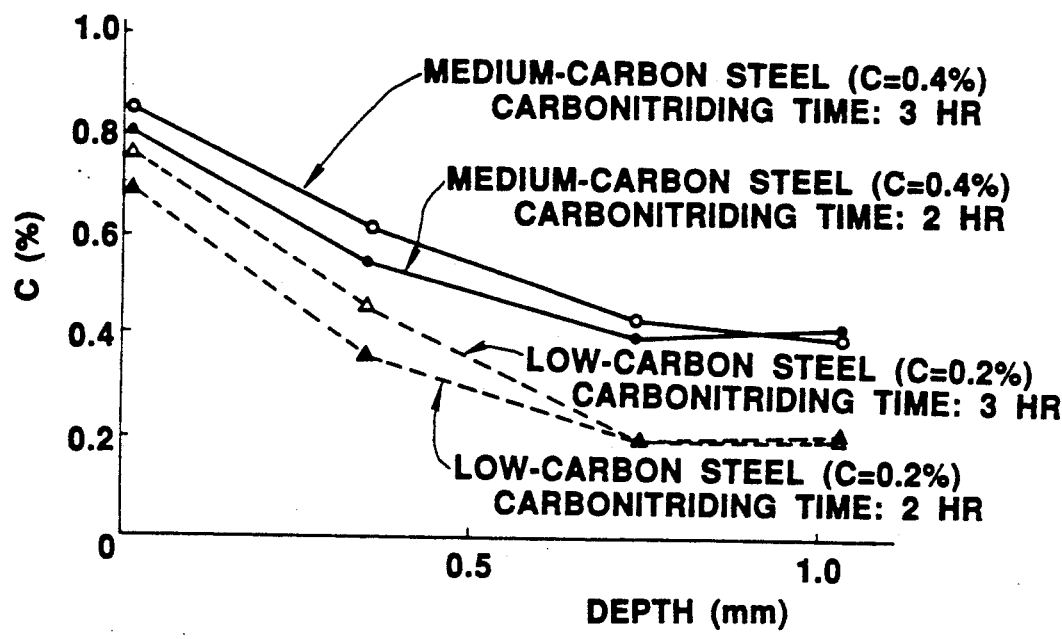
FIG. 3 is a characteristic graph of a relationship between a depth from the surface of a tested material and the content of carbon in wt %.

FIG. 3 represents characteristics between carbonitriding times for a medium-carbon steel, the content of base carbon of which is 0.4 wt %, and a low-carbon steel, the content of base carbon of which is 0.2 wt % and gradients in depth of carbon weight percentage. The carbonitriding atmosphere of the cases shown in FIG. 3 equalled that of Table 4. The carbonitriding temperature of the cases shown in FIG. 3 was 850° C.

As is apparent from FIG. 3, the carbonitriding time of the medium-carbon steel of the present invention required for producing a carbon weight percentage required for a depth at which a shearing stress is imposed is much shorter than the carbonitriding time of the low-carbon steel. This was advantageous in terms of cost. Thus, the heat treatment productivity of the tested materials R and S made of the low-carbon steel was reduced.

Figure 4:
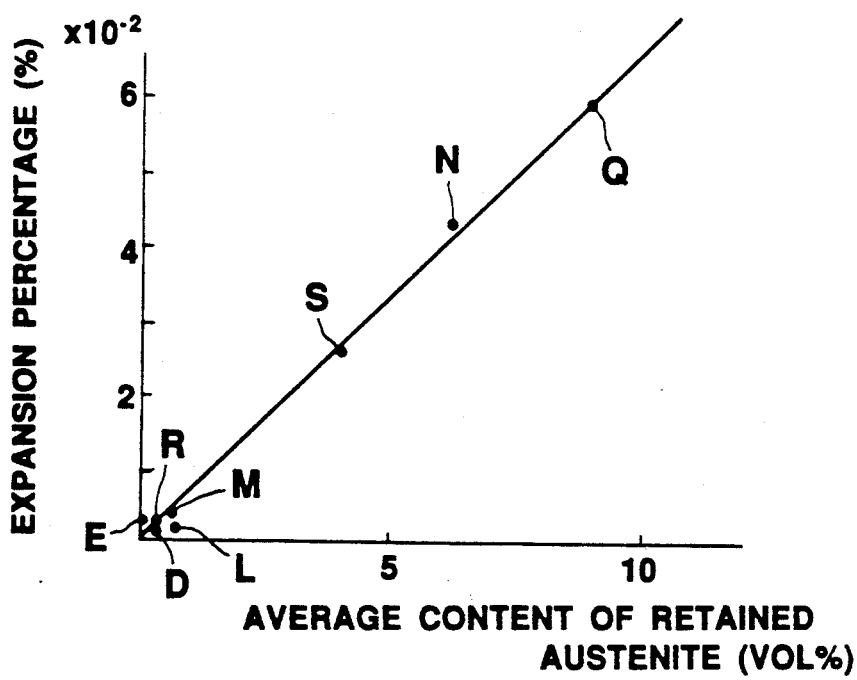
FIG. 4 is a characteristic graph of a relationship between an average content of retained austenite and an expansion percentage representing a dimensional change.

FIG. 4 represents the results of a test of the dimensional stability at high temperature. In this test, the tested materials L to S were placed in the thermostatic oven at 170° C. for 500 hours and then the expansion percentage of 170° C. case to room-temperature (20° C.) case of each of the tested materials was measured since transforming retained austenite of each of the tested materials L to S into martensite at high temperature expands the tested material.

As is apparent from FIG. 4, since the contents of retained austenite of the tested materials N, Q and S which were tempered at 160° C., a normal temperature, failed to be zero vol %, the expansion percentage of each of the tested materials N, Q and S was high so that the dimensional stability of each of the tested materials N, Q and S could be further improved. In particular, the content of retained austenite of the tested material Q, which was a high-carbon steel and the tempering temperature of which was not high, was highest. Thus the dimensional stabilities of the tested materials L and M of the rolling contact parts steel of Embodiment 2 as well as the control tested materials O, P and R were higher than that of the control tested materials N, Q and S.

Figure 5:
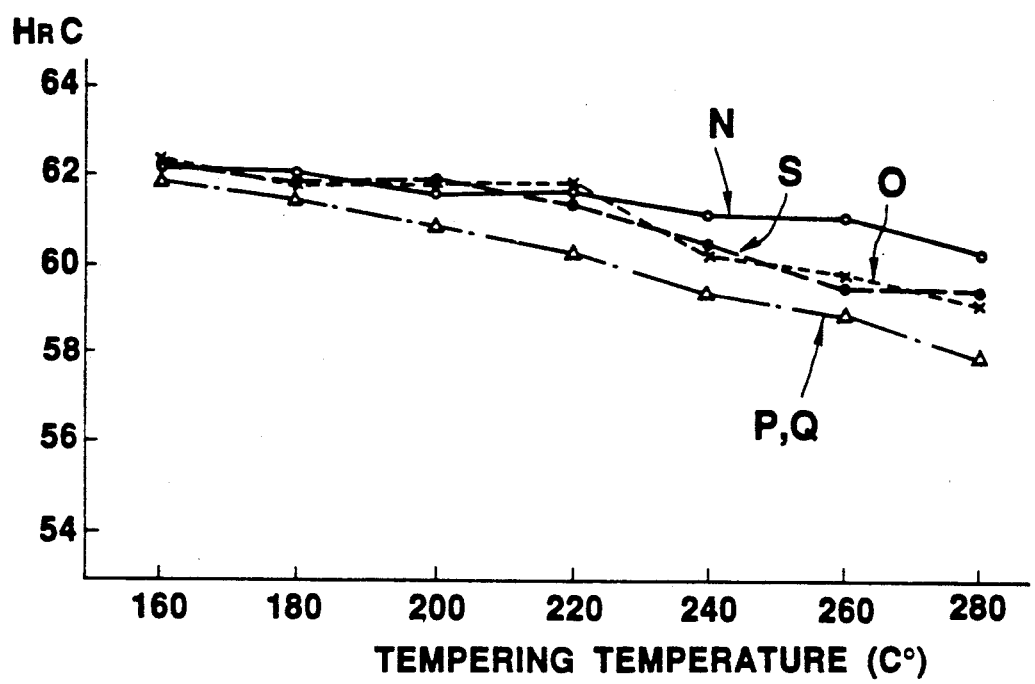
FIG. 5 is a characteristic graph of a relationship between a tempering temperature and the surface hardness of a rolling contact part.

FIG. 5 represents characteristic relationships between tempering temperatures and the surface hardnesses of rolling contact parts steels. Generally, the higher the tempering temperature, the lower the surface hardness. A reduction in the surface hardness of the tested material N which was carbonitrided was lower by the operation of N which increased the tempering softening resistance than those of the tested materials O and S which were not carbonitrided; but were carburized. Since the tested material O differed from the tested material only in that the tested material O was not carbonitrided; but was carburized, it was confirmed that carbonitriding increased the tempering softening resistance. The tested materials P and Q were high-temperature tempered to soften these materials.

Single-row deep-grooved ball bearings (6206) with a 62-mm outer diameter, a 30-mm bore diameter and a 16-mm length was made of the tested materials L, M, O, P and R. A ball bearing life tester produced by Nippon Seiko K.K. measured the $L_{10}$ life of each of these ball bearings.

Conditions of measurement were as follows:
Lubricating oil: FKB oil R068 produced by NIPPON OIL CO., LTD.;
Bearing load: 1,400 kgf radial load;
Bearing rotational speed: 2,000 rpm;
Test temperature: 150° C.

The life of each of the tested ball bearings was defined as the rotational cycle number at which the tested ball bearings experienced a flaking.

Figure 6:
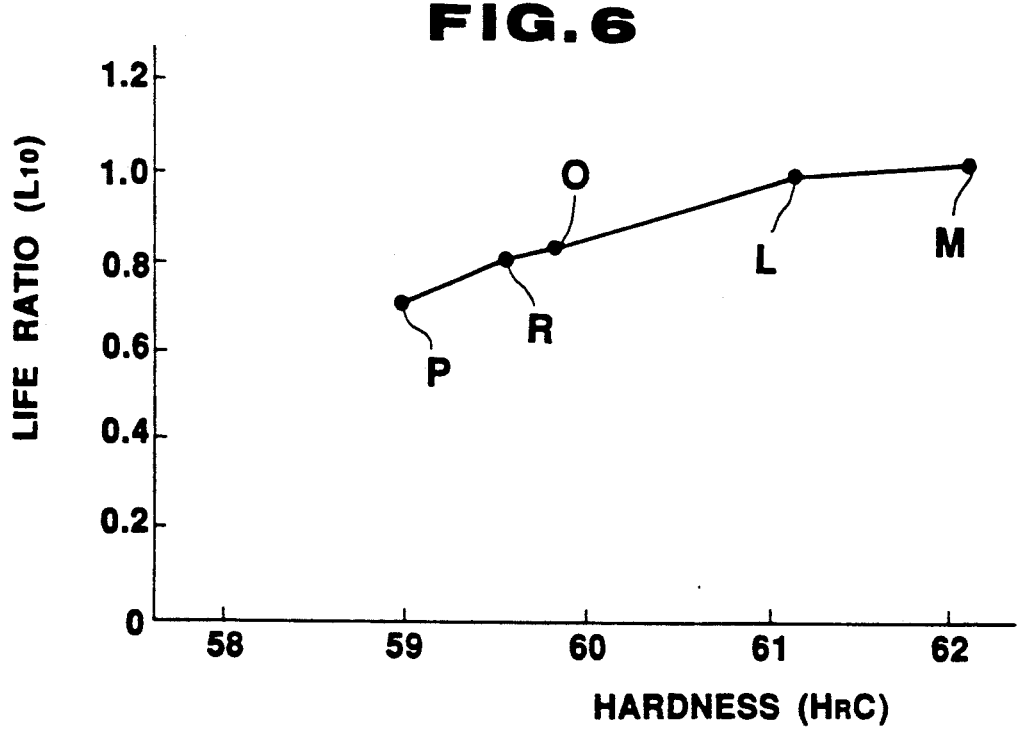
FIG. 6 is a characteristic graph of a relationship between the surface hardness of a rolling contact parts steel and the life of a rolling bearing.

FIG. 6 represents a characteristic graph of the life ratios of the tested materials L, M, O, P and R when the life of the tested ball bearing made of the tested material L is 1. The higher the surface hardness of the tested material, the longer the life of the tested ball bearing. Since the tempering softening resistances of the tested materials L and M were superior so as to prevent a reduction in surface hardness after high-temperature tempering, the lives of the tested ball bearings made of the tested materials L and M were good. It was confirmed that the below 9 ppm content of oxygen of the tested materials L and M provided good lives of the tested ball bearings made of the tested materials L and M.

In accordance with the above bearing life test, all of the rolling contact parts, i.e., the inner and outer races and the rolling element, of the tested ball bearing were made of the tested materials L and M of Embodiment 2. However, a tested rolling bearing comprising at least one of the rolling contact parts which was made of the tested material L or M of Embodiment 2 had a greater increased life than a conventional rolling bearing.

What is claimed is:

1. A rolling bearing, comprising:
races; and
a rolling element, at least one of the races and the rolling element being made of a rolling contact parts steel consisting essentially of: C: about 0.2–0.6 wt. %, Si: about 0.3–2.0 wt. %, Cr: about 0.5–2.5 wt. %, Mn: about 0.3–1.7 wt. %, O: not more than 12 ppm, and the balance of Fe and any inevitable impurity, the one of the races and the rolling element being carbonitrided, quenched to be hardened, and then, finally, high temperature tempered at about 240° C.–550° C. such that carbides are precipitated in the hardened surface layer of the one of the races and the rolling element, the size of the carbides being 0.5–1.0 μm in diameter, and the content of the carbides in the surface layer being about 20–50 vol %, wherein the average content of retained austenite in the one of the races and the rolling element is not more than about 3 vol %.

2. The rolling bearing as recited in claim 1 wherein the weight percent range of C is 0.3–0.6 wt %, the weight percent range of Cr is 1.8–2.5 wt %, and the weight percent range of Mn is 0.3–1.6 wt %.

3. The rolling bearing as recited in claim 1 wherein the rolling contact parts steel further consists essentially of Mo: not more than 3.0 wt %.

4. The rolling bearing as recited in claim 3 wherein the rolling contact parts steel further consists essentially of V: 0.1–1.0 wt %.

* * * * *